(12) United States Patent
Korcz et al.

(10) Patent No.: US 8,714,506 B2
(45) Date of Patent: May 6, 2014

(54) MOUNTING ASSEMBLY FOR ELECTRICAL FIXTURE

(75) Inventors: Krzysztof W. Korcz, Granger, IN (US); Mahran H. Ayrton, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 291 days.

(21) Appl. No.: 12/551,852

(22) Filed: Sep. 1, 2009

(65) Prior Publication Data

US 2011/0048759 A1 Mar. 3, 2011

(51) Int. Cl.
  *A47G 29/02* (2006.01)
  *E04G 3/20* (2006.01)
  *E06B 7/28* (2006.01)

(52) U.S. Cl.
  USPC ........... 248/343; 248/342; 248/317; 248/547; 248/906; 220/3.92; 220/3.94; 220/3.9; 174/58; 174/561

(58) Field of Classification Search
  USPC ......... 248/343, 342, 317, 547, 906, 489, 200, 248/220.21, 220.22, 226.11, 227.2; 220/3.92, 3.94, 3.9, 3.2, 3.3, 3.5; 174/58, 561, 563; 52/712, 28, 39
  See application file for complete search history.

(56) References Cited

U.S. PATENT DOCUMENTS

| | | | |
|---|---|---|---|
| 2,757,817 A * | 8/1956 | Egan | 220/3.5 |
| 3,049,579 A * | 8/1962 | Sulzer | 174/521 |
| 4,533,060 A * | 8/1985 | Medlin | 220/3.9 |
| 4,887,073 A * | 12/1989 | Nakao et al. | 340/693.11 |
| 5,183,233 A | 2/1993 | LaPalmento | |
| 5,522,577 A | 6/1996 | Roesch | |
| 5,762,223 A * | 6/1998 | Kerr, Jr. | 220/3.9 |
| 5,939,671 A * | 8/1999 | Gretz | 174/50 |
| 6,100,469 A | 8/2000 | Jorgensen et al. | |
| 6,152,413 A | 11/2000 | Gretz | |
| 6,323,424 B1 * | 11/2001 | He | 174/58 |
| 6,474,846 B1 * | 11/2002 | Kelmelis et al. | 362/365 |
| 6,646,201 B1 * | 11/2003 | Gretz | 174/58 |
| 6,682,036 B1 * | 1/2004 | Hsu | 248/343 |
| 6,794,573 B1 * | 9/2004 | Ofcharsky et al. | 174/58 |
| 6,877,703 B2 * | 4/2005 | Tang | 248/342 |
| 6,924,431 B1 * | 8/2005 | Ofcharsky et al. | 174/58 |
| 6,956,170 B1 * | 10/2005 | Gretz et al. | 174/58 |
| 6,965,077 B2 | 11/2005 | Halbert | |

(Continued)

*Primary Examiner* — Terrell McKinnon
*Assistant Examiner* — Michael McDuffie
(74) *Attorney, Agent, or Firm* — Garrett V. Davis; Mark S. Bicks; Aldred N. Goodman (57) ABSTRACT

A mounting assembly and method are provided for mounting an electrical fixture to a ceiling structure. The mounting assembly includes a mounting plate and a cover plate overlying the mounting plate. The mounting plate includes a plurality of strengthening ribs and a plurality of fastener holes for receiving fasteners to mount the mounting plate directly to the ceiling support structure. The mounting plate has a dimension to overlie the support structure and a portion of an electrical box mounted adjacent the support structure to define an open area of the electrical box. Mounting bolts extend downwardly from the mounting plate for attaching to a bracket which supports an electrical fixture such as a ceiling fan. The mounting bolts and the bracket supporting the electrical fixture are cantilevered with respect to the ceiling support. The mounting assembly can be used as a retrofit and mounted over an existing ceiling substrate with screws that can pass through the ceiling substrate into the ceiling support. The cover plate has a dimension to cover the mounting plate and the open area of the electrical box.

20 Claims, 5 Drawing Sheets

(56) References Cited

U.S. PATENT DOCUMENTS

| | | |
|---|---|---|
| 7,053,301 B2 | 5/2006 | Johnson |
| 7,105,742 B1 * | 9/2006 | Jolly ............................ 174/50 |
| 7,135,640 B1 * | 11/2006 | Ofcharsky et al. ............. 174/58 |
| 7,170,015 B1 * | 1/2007 | Roesch et al. ................ 174/480 |
| 7,186,916 B2 * | 3/2007 | Jacks ............................ 174/53 |
| 7,271,350 B2 * | 9/2007 | Johnson ....................... 174/480 |
| 7,306,191 B1 * | 12/2007 | Chen ......................... 248/228.7 |
| 7,347,580 B2 * | 3/2008 | Blackman et al. ........... 362/147 |
| 7,361,833 B2 | 4/2008 | Dinh |
| 7,381,892 B2 * | 6/2008 | Dinh et al. ..................... 174/58 |
| 7,455,271 B2 * | 11/2008 | Pincek et al. ............. 248/288.31 |
| 7,518,059 B2 * | 4/2009 | Herth .............................. 174/58 |
| 7,531,744 B1 * | 5/2009 | Rohmer ......................... 174/58 |
| 7,595,448 B2 * | 9/2009 | Herth .............................. 174/58 |
| 7,628,367 B2 * | 12/2009 | Friederich et al. ............ 248/343 |
| 7,902,457 B2 * | 3/2011 | Johnson ......................... 174/61 |
| 2004/0011936 A1 * | 1/2004 | Cousin ........................ 248/343 |
| 2005/0067545 A1 * | 3/2005 | Coble et al. .................. 248/343 |
| 2005/0072778 A1 * | 4/2005 | Hull et al. ..................... 220/3.2 |
| 2005/0109907 A1 * | 5/2005 | Herth ............................ 248/318 |
| 2006/0237211 A1 * | 10/2006 | Phillips ......................... 174/58 |
| 2006/0261235 A1 * | 11/2006 | Rippel et al. ................. 248/343 |
| 2008/0054134 A1 * | 3/2008 | Shafer .......................... 248/200 |

* cited by examiner

MOUNTING ASSEMBLY FOR ELECTRICAL FIXTURE

FIELD OF THE INVENTION

The present invention is directed to a mounting system and assembly for mounting and suspending an electrical fixture to a support structure. The invention is particularly directed to a mounting assembly that is adapted for attaching to the outer surface of a ceiling substrate and to a ceiling support without removing the ceiling substrate. The mounting assembly of the invention is particularly suitable for retrofitting an existing electrical box to support a ceiling fan or other electrical fixture.

BACKGROUND OF THE INVENTION

A wide variety of mounting assemblies and brackets have been developed for supporting an electrical fixture such as lights and ceiling fans. The mounting assemblies are required to be fastened securely to the structural support of the ceiling to properly support the weight of the electrical fixture. Electrical fixtures, such as ceiling fans, can be mounted directly to an electrical box provided the electrical box is rated for ceiling fans and is securely mounted to a structural member.

Typically a cross bar is attached between the adjacent ceiling joists by nails, screws or other fasteners. A ceiling fan rated electrical box is then attached to the cross bar and the electrical fixture is attached to the electrical box. The electrical box is required to be made of heavy gauge materials and be rated for supporting the weight of the electrical fixture. Many mounting systems have an expandable bar that can be used to retrofit an opening in the ceiling. The existing electrical box is removed and the bar is inserted through the opening in the ceiling. The bar is then expanded to engage the opposing surfaces of the ceiling joists. The electrical box must then be installed through the opening in the ceiling on the cross bar so that the bottom end of the electrical box is flush with the outer face of the ceiling. While these devices are generally effective, they can be cumbersome and difficult to mount correctly without damaging the existing ceiling.

Various devices have been proposed for mounting a support over the existing ceiling by screws or bolts that extend through the ceiling material and into the ceiling joist or support. One example is disclosed in U.S. Pat. No. 5,183,233 to LaPalomento which discloses a universal ceiling support. The assembly includes a support panel that is affixed to the grid work of a ceiling by screws that extend through the ceiling tile and into the grid work. The panel has a hole to enable wires to pass through to the ceiling fan or fixture. The panel has a slot in the rear to hold the panel flush against the flat surface while carrying the wires in the slot. A bracket is attached to the panel for supporting the weight of the fixture. The bracket is mounted to the panel over the slot and includes a hole to allow the wires to pass through.

Another mounting device is disclosed in U.S. Pat. No. 5,522,577 to Roesch. This patent discloses a ceiling pan support arrangement for attaching to a beam located inwardly from the support beam and the surface of the ceiling. The device includes a box with a bottom wall attached to the beam, side walls and a flange extending outwardly from the side walls. A rigid metal plate is positioned over the open end of the box and fasteners are passed through openings in the plate and the flange of the electrical box and into the beam. This arrangement is generally suitable only where a cross beam in available or can be conveniently installed.

Another example of a mounting system is disclosed in U.S. Pat. No. 5,939,671 to Gretz. This device includes a box with a bottom wall that is formed in a series of steps so that one of the steps can be attached to the ceiling support. A cover plate can be attached to the box to cover the opening.

Still another mounting device is disclosed in U.S. Pat. No. 6,152,413 to Gretz. This device includes a mounting block having a central electrical box with a closed bottom, an open top and a planar medallion portion about the periphery of the of the box. The box has a centrally located mounting hole and pair of slots providing adjustable channels.

An example of an electrical box that is constructed to support a ceiling fan or other electrical fixture is disclosed in U.S. Pat. No. 6,100,469 to Jorgensen et al. The electrical box has a top portion and a side portion extending around the top portion. The side portions have two opposing spaced tabs extending inwardly toward each other. The tabs have an opening therein. At least one mounting hole is formed in either the top portion, side portion or the corner formed between the top and side portion. A mounting screw is inserted through the mounting holes to engage the ceiling joist and to support the electrical box.

While the prior devices have generally been suitable for the intended use, many of these devices can not be used to retrofit an existing structure. Accordingly, there exists a need in the industry for improved mounting systems for electrical fixtures.

SUMMARY OF THE INVENTION

The present invention is directed to a mounting assembly for mounting an electrical fixture to a ceiling support. More particularly, the invention is directed to mounting assembly that can be attached to a finished ceiling without the need for extensive retrofitting work.

The mounting assembly of the invention is attached to an existing ceiling support and includes a mount to suspend the electrical fixture such that the electrical fixture is cantilevered with respect to the ceiling support. In a preferred embodiment, the electrical device is supported directly below the existing electrical box so that it is not necessary to move or replace the electrical box.

Accordingly, a primary aspect of the invention is to provide a mounting assembly that is convenient and easy to use which can be mounted directly over the existing ceiling. The mounting assembly includes a mounting plate having a plurality of mounting holes that allow screws to pass through the ceiling to engage the ceiling support. At least one of the holes is formed at an incline with respect to the plane of the mounting plate to angle the screw into the ceiling support thereby securing the mounting plate to the ceiling support. The inclined screws are provided on the mounting plate in a location to resist twisting of the mounting plate and allow a screw to enter the ceiling support close to its edge without risk of the screws splitting the ceiling support.

Another aspect of the invention is to provide a mounting assembly that is adapted for use with an existing electrical box and ceiling substrate that are mounted to a ceiling support or ceiling joist. The mounting assembly is attached directly to the ceiling support by passing screws or other fasteners through openings in the mounting assembly and the ceiling substrate into the ceiling support. The mounting assembly overlies the ceiling joist and covers a portion of the open end of the electrical box. The electrical fixture is then mounted to the mounting assembly such that the attachment point is cantilevered with respect to the ceiling support. The electrical fixture can then be attached directly to the mounting assembly. A cover plate can be attached to the mounting assembly between the mounting assembly and the electrical fixture.

Still another aspect of the invention is to provide a method of retrofitting an existing electrical box to accommodate a ceiling fan by mounting a mounting plate directly over the existing ceiling material and the electrical box and secured to the ceiling support by passing screws through the ceiling material into the ceiling support. The ceiling fan is mounted to the mounting plate at a position over the open end of the electrical box so that the ceiling fan is cantilevered with respect to the ceiling support. A cover plate is mounted over the mounting plate and the open end of the electrical box.

A further aspect of the invention is to provide a mounting assembly that can be mounted over an existing electrical box in a ceiling with no weight of the electrical fixture being transferred to the electrical box. The mounting assembly includes a cover plate to overlie the opening in the ceiling and the open end of the electrical box.

The various aspects of the invention are basically attained by providing a mounting assembly for mounting an electrical fixture to a ceiling. The mounting assembly includes a mounting plate having a first portion with a plurality of apertures for aligning with a ceiling joist and a tab extending upwardly perpendicular to the plane of the mounting plate with respect to the ceiling joist. The mounting assembly has a second portion spaced from the first portion and has a coupling member for coupling with the electrical fixture. The second portion is cantilevered with respect to the first portion and the ceiling joist.

The aspects of the invention are further attained by providing an electrical assembly comprising an electrical fixture, a ceiling support, an electrical box mounted adjacent the ceiling joist, and a mounting plate. The mounting plate is adapted for mounting to the ceiling support and overlying a portion of an open end of the electrical box. The mounting plate has a first portion with a plurality of apertures for aligning with the ceiling support for receiving mounting screws. A tab extends upward from a plane of the first portion for aligning with an inner edge of the electrical box. A second portion of the mounting plate is spaced from the first portion and has a coupling member for supporting the electrical fixture. The second portion has a dimension to overlie a portion of the open end of the electrical box to enable wiring to pass from the electrical box to the electrical fixture.

The aspects of the invention are further attained by providing a method of suspending an electrical fixture from a ceiling support having an electrical box adjacent the ceiling support. The electrical box has a downwardly open end. The method includes the steps of positioning a mounting plate below the ceiling support where the mounting plate has a first portion aligned with the ceiling support. The first portion of the mounting plate has a plurality of apertures aligned with the ceiling support. The mounting plate has a second portion overlying a portion of the open end of the electrical box. A fastener is passed through a respective hole in the first portion of the mounting plate and into the ceiling support to fasten the mounting plate to the ceiling support. A mounting bracket is coupled to the second portion of the mounting plate and the electrical fixture is coupled to the mounting bracket. Wiring is passed between the electrical box and the electrical fixture. The electrical fixture is suspended below the open end of the electrical box and cantilevered with respect to the first portion and the ceiling support.

Various other aspects and features of the invention will become apparent to those skilled in the art in view of the annexed drawings and the following detailed description of the invention which disclose various embodiments of the invention

BRIEF DESCRIPTION OF THE DRAWINGS

The following is brief description of the drawings in which.

DETAILED DESCRIPTION OF THE INVENTION

The present invention is directed to a mounting system and mounting assembly for supporting an electrical fixture such as a ceiling fan. The invention is particularly directed to a mounting assembly that can be attached directly to a ceiling support and over a ceiling substrate mounted on the support.

Referring to the drawings, the mounting system of the invention includes a mounting assembly 10 having a mounting plate 12 and a cover plate 14. The mounting assembly 10 of the invention is adapted for retrofitting and mounting an electrical fixture such as a ceiling fan to a finished ceiling which can include an electrical box and suitable electrical wiring.

Figure 2:
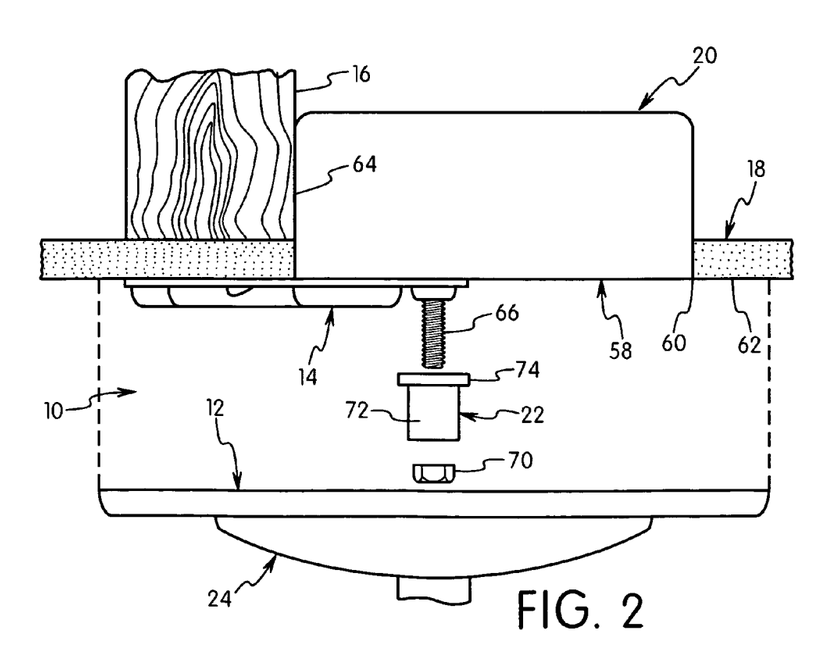
FIG. 2 is an exploded side elevational view of the mounting assembly showing the mounting plate, mounting bracket, cover plate and the electrical fixture.

As shown in FIG. 2, the mounting system of the invention includes a ceiling support 16, a ceiling substrate 18 and an electrical box 20. Ceiling support 16 can be a standard ceiling joist made of wood or metal. Alternatively, ceiling support 16 can be a grid or other support for supporting the ceiling substrate. The ceiling substrate 18 can be ceiling tiles or gypsum board commonly used in the building industry. A mounting bracket 22 is attached to mounting assembly 10 for supporting an electrical fixture such as a ceiling fan 24 or light fixture.

Figure 6:
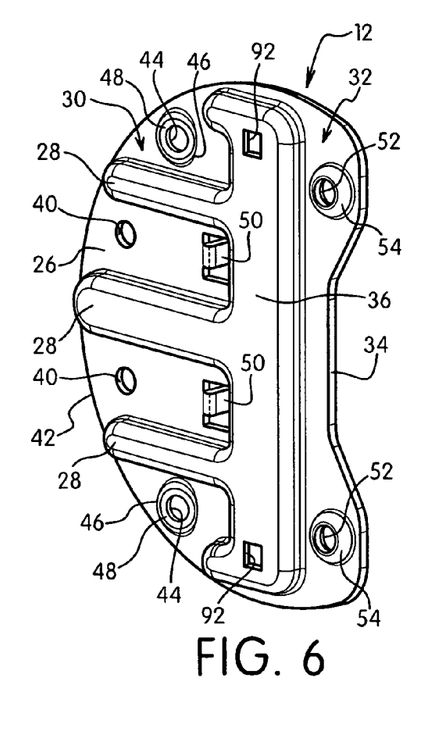
FIG. 6 is bottom perspective view of the mounting plate of the mounting assembly of the embodiment of FIG. 1.
Figure 7:
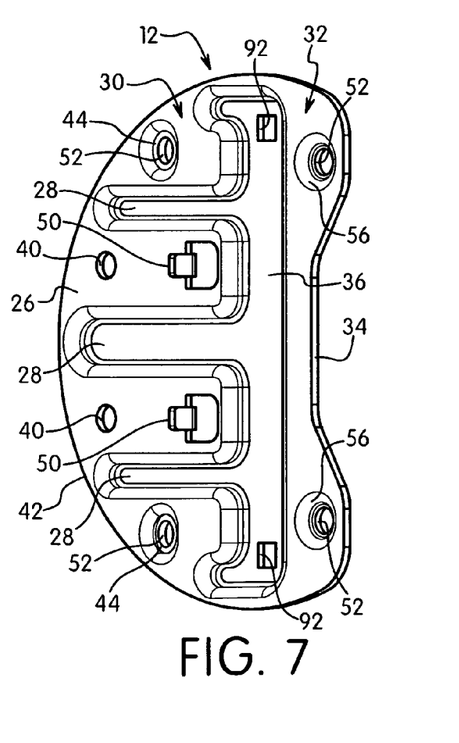
FIG. 7 is top perspective view of the mounting plate.

Mounting plate 12 of mounting assembly 10 is a one piece member formed of steel which is stamped, punched and cut to the desired shape. In the embodiment illustrated, mounting plate 12 has a planar base 26 with embossed ribs 28. Base 26, as shown in FIGS. 6 and 7, has a longitudinal dimension with a first side portion 30 and a second side portion 32 on opposite sides with respect to the longitudinal dimension of mounting plate 12. First portion 30 of mounting plate 12 has a generally curved outer edge as shown in FIGS. 6 and 7. Second portion 32 has an outer edge with a recessed portion 34 forming a concave edge.

As shown in FIGS. 6 and 7, mounting plate 12 includes a plurality of ribs 28 extending substantially perpendicular to the longitudinal dimension of mounting plate 12 and extending from the edge of first portion 30 toward the second portion 32. The ribs 28 are joined with a longitudinal rib 36 which extends in the longitudinal direction of mounting plate 12. Ribs 28 and 36 are formed to strengthen mounting plate 12 and resist bending and twisting under load. Preferably, the ribs extend from an outer face of mounting plate 12 as shown in FIG. 6 to extend away from the ceiling surface when installed.

First portion 30 of mounting plate 12 includes several screw holes for receiving screws 38. In the embodiment illustrated, three parallel ribs 28 are provided with a first screw hole 40 oriented toward the outer edge 42. The longitudinal ends of mounting plate 12 include a second screw hole 44 that is spaced inwardly from the first screw holes 40 with respect to the longitudinal dimension of mounting plate 12. In a preferred embodiment shown in FIGS. 5 and 6, second screw holes 44 are formed from an embossed raised dimple portion 46 having a face 48 that is inclined with respect to the plane of base 26 and the plane of mounting plate 12. Second screw holes 44 extend through the face 48 so that the screws 38 passing through screw holes 44 are oriented at an incline with respect to the plane of mounting plate 12.

First portion 30 of base 26 includes a pair of tabs 50 punched and cut from the material of mounting plate 12. Tabs 50 preferably extend in an upward direction from the top side of mounting plate 12 shown in FIG. 7 in a direction substantially perpendicular to the plane of base 26 and mounting plate 12. As shown in FIGS. 6 and 7, tabs 50 are aligned substantially parallel with second screw holes 44 and spaced inwardly from screw holes 44.

Second portion 32 of base 26 includes threaded holes 52 positioned at the longitudinal ends of second portion 32. Threaded holes 52 are formed with an embossed collar 54 extending outwardly from the outer bottom face of mounting plate 12 which forms a recess 56 in the top face of mounting plate 12 as shown in FIG. 7. In the embodiment illustrated, holes 52 include internal threads for receiving a mounting bolt 66. Alternatively, holes 52 can have a smooth surface with a dimension sufficient to allow a fastener to pass through. Threaded holes 52 are preferably spaced apart a distance for coupling with a mounting bracket or electrical fixture.

Figure 4:
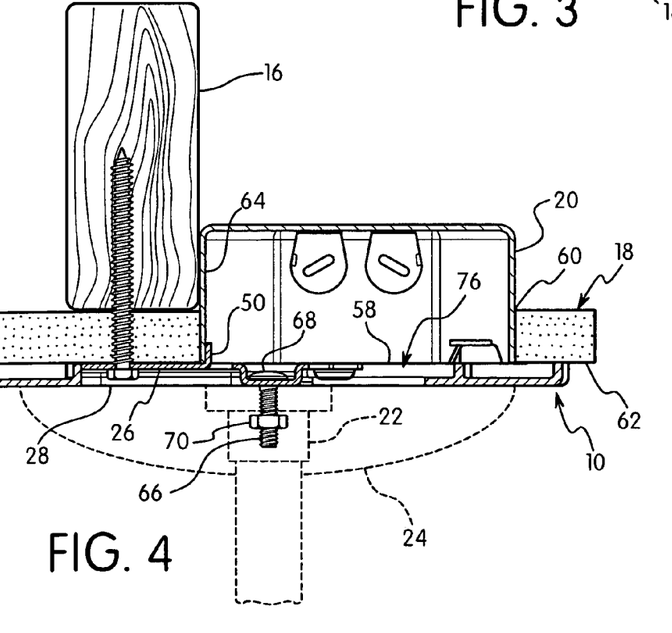
FIG. 4 is a cross sectional side view of the mounting assembly taken along line 4-4 of FIG. 3.
Figure 5:
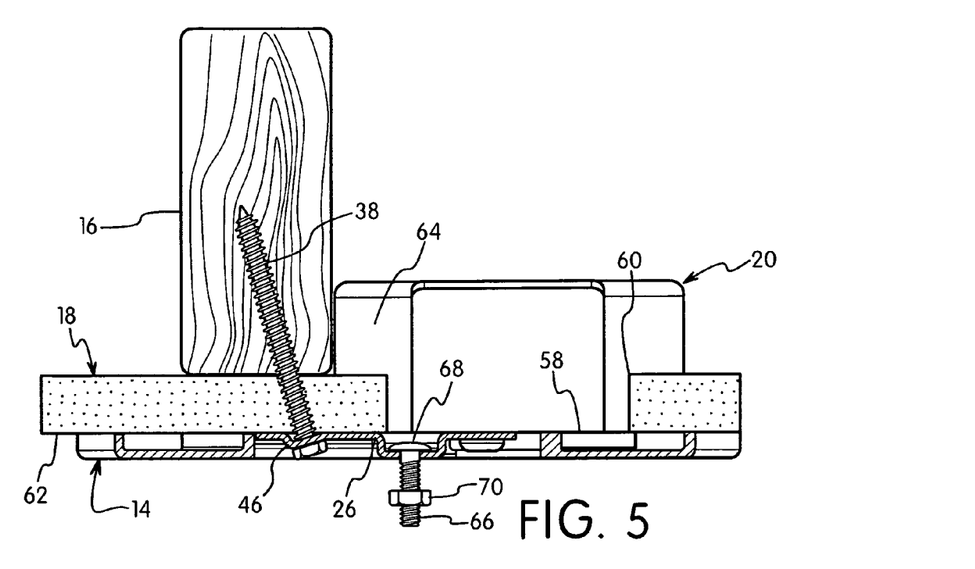
FIG. 5 is a cross sectional side view of the mounting assembly taken along line 5-5 of FIG. 3.

In one embodiment of the invention, mounting assembly 10 is adapted for mounting to a finished ceiling and ceiling joist as shown in FIGS. 4 and 5. Preferably, electrical box 20 is mounted adjacent the ceiling joist 16 such that the side edge of the electrical box abuts the side of the ceiling joist as shown in FIG. 5. Alternatively, electrical box 20 can be mounted to a suitable support that can extend between two parallel ceiling joists in a conventional manner. Preferably, electrical box 20 is positioned with respect to ceiling joist 16 and ceiling substrate 18 such that the open end 58 of electrical box 20 extends through a hole 60 in ceiling substrate 18 and is substantially flush with the outer surface 62 of ceiling substrate 18. Mounting plate 12 is positioned directly on the ceiling substrate 18 with tabs 50 contacting the inner surface of the side wall 64 of electrical box 20 as shown in FIG. 4. Tabs 50 are preferably oriented with respect to screw holes 40 and 44 to align the screw holes with the ceiling joist 16 when tabs 50 are aligned with the side wall 64 of electrical box 20 and the side surface of the ceiling joist 16.

Screws 38 pass through first screw holes 40 and through the ceiling substrate 18 directly into the ceiling joist 16. As shown in FIG. 5, screws 38 passing through first screw holes 40 extend substantially parallel to the dimension of the ceiling joist 16 and perpendicular to the plane of mounting plate 12. The screws 38 passing through the second screw holes 44 as shown in FIG. 5 are oriented at an incline with respect to the plane of mounting plate 12 and the longitudinal dimension of the ceiling joist 16. The multiple screws and the different angles of the screws provide a secure attachment of mounting plate 24 to the ceiling joist 16. The angled screws 38 resist bending of the mounting plate 12 and enable the electrical box to be cantilevered with respect to the ceiling joist 16.

A mounting bolt 66 in the embodiment illustrated extends downwardly through threaded holes 52 as shown in FIG. 5. The recessed portion 56 in second portion 32 of mounting plate 12 has a dimension to receive the head 68 of mounting bolt 66 so that head 68 sits below the top surface of mounting plate 12. Preferably, mounting bolt 66 is threaded into threaded holes 52 to stabilize the bolt during assembly. As shown in FIGS. 2 and 4, mounting bracket 22 is coupled to mounting bolts 66 by nuts 70. Mounting bracket 22 can have any suitable shape capable of supporting the electrical fixture 24 and attaching to mounting bolts 66. In one embodiment, mounting bracket 22 has a substantially U-shape with a body portion 72 and legs 74 having holes for receiving the mounting bolts 66. The electrical fixture 24, such as a ceiling fan, is attached to mounting bracket 22 in a manner known in the art.

Mounting plate 12 is securely attached to the ceiling joist 16 with the second portion 32 of mounting plate 12 and the mounting bolts 66 spaced outwardly from the plane of the ceiling joist 16 as shown in FIG. 4 and FIG. 5. In this manner, mounting bolts 66 do not interfere with the attachment of mounting plate 12 to the ceiling joist 16 by the screws 38. As shown in FIGS. 2 and 4, mounting bolt 66 and the electrical fixture 24 are suspended outwardly from the ceiling joist 16 such that the mounting bolts and the electrical fixture 24 are cantilevered with respect to mounting plate 12 and the ceiling joist 16. Mounting plate 12 has a dimension and is made of a suitable material capable of supporting the weight of the electrical fixture without the need for the mounting plate to extend between a pair of adjacent ceiling joists. Mounting plate 12 is capable of supporting the electrical fixture 24 from a single ceiling joist with the electrical fixture being cantilevered with respect to the ceiling joist. Strengthening ribs 28 and longitudinal rib 36 preferably provide sufficient strength to mounting plate 12 to resist bending under the weight of the electrical fixture and to prevent flexing or twisting of mounting plate 12 during use. Mounting bolts 66 are spaced closely to the screw holes of mounting plate 12 to supporting a ceiling fan without wobbling or excessive movement of mounting plate 12 during operation of the ceiling fan.

Mounting plate 12 preferably has a dimension to overlie a portion of the open end 58 of electrical box 20 to form an open area 76 to allow wires to pass between electrical box 20 and electrical fixture 24. In a preferred embodiment of the invention, mounting plate 12 is not attached directly to electrical box 20 so that the weight of the electrical fixture 24 is transferred directly to the ceiling joist 16 without transferring load to the electrical box.

Figure 1:
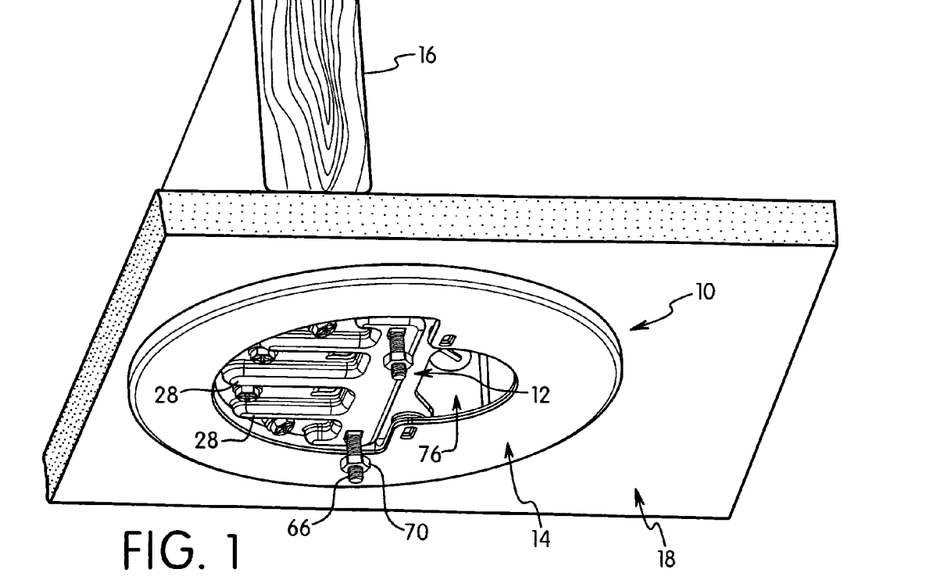
FIG. 1 is bottom perspective view of the mounting assembly of the invention attached to a ceiling.
Figure 3:
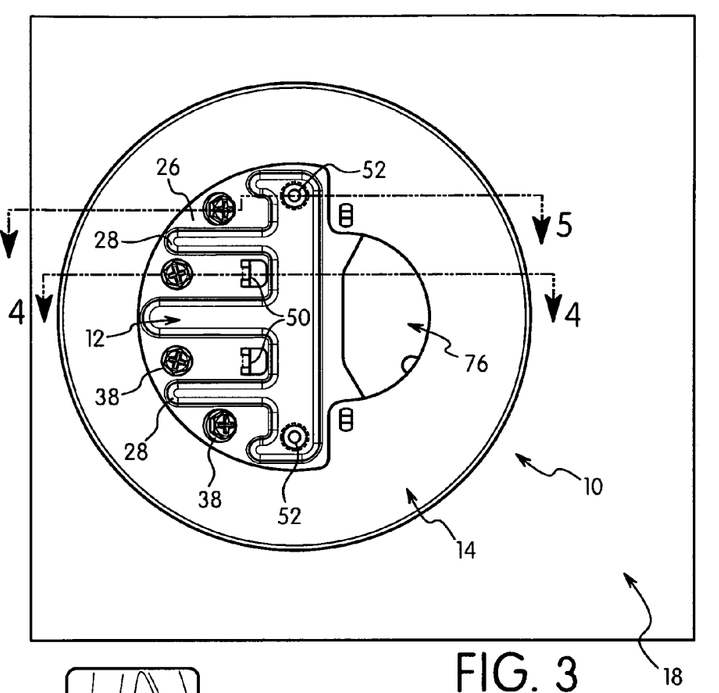
FIG. 3 is bottom plan view of the mounting assembly showing the mounting plate and cover plate.
Figure 11:
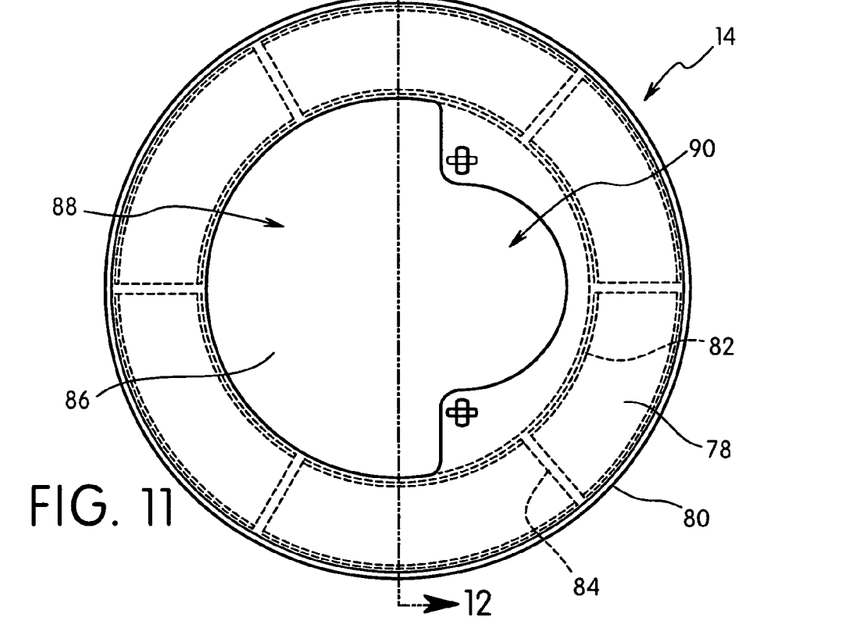
FIG. 11 is a bottom view of the cover plate in one embodiment of the invention.

Cover plate 16 in the embodiment illustrated has a generally circular shape with a planar surface 78 forming an outer face. Cover plate 14 has an outer lip 80 and an inner circular lip 82 concentric with the outer lip 80. As shown in FIG. 11, cross braces 84 extend between inner lip 82 and outer lip 80. Inner lip 82 and outer lip 80 define a height of cover plate 14 corresponding substantially to the height of mounting plate 12 as shown in FIG. 4. Inner lip 82 has a radius of curvature corresponding substantially to the curvature of the side edge of mounting plate 12 as shown in FIG. 3 and FIG. 1 so that inner lip 82 contacts the curved edge 42 of mounting plate 12.

Outer face 78 of cover plate 14 has a central opening 86 with a first portion 88 and a second portion 90. First portion 88 of central opening 86 is aligned with inner lip 82 and has a radius of curvature corresponding to the curvature of inner lip 82. Second portion 90 has a semi-circular shape with a radius of curvature substantially less than the radius of curvature of first portion 88. Second portion 90 is oriented to overlie the open area 76 of electrical box 22 to allow wiring to pass between electrical box 20 and electrical fixture 24.

Figure 8:
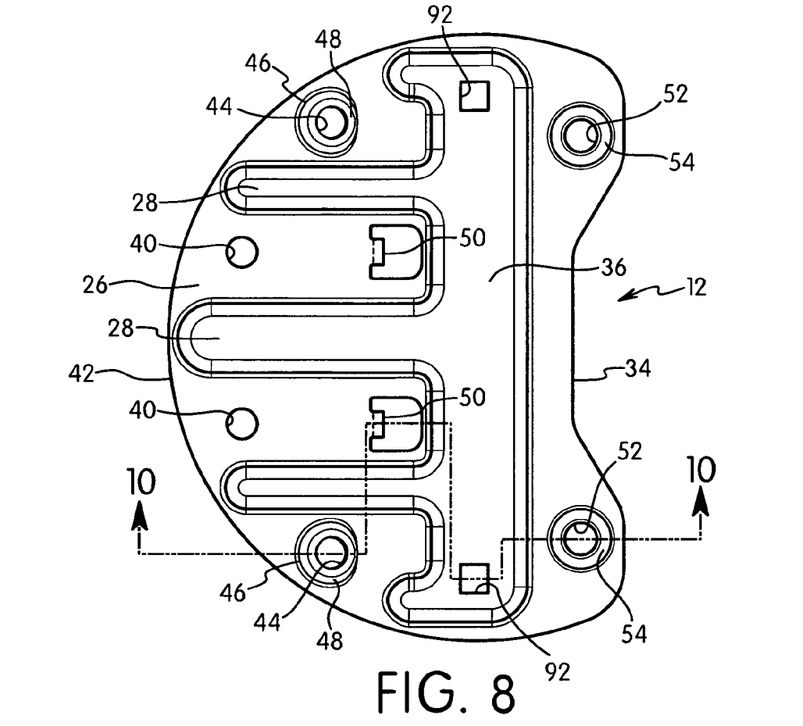
FIG. 8 is bottom view of the mounting plate.
Figure 9:
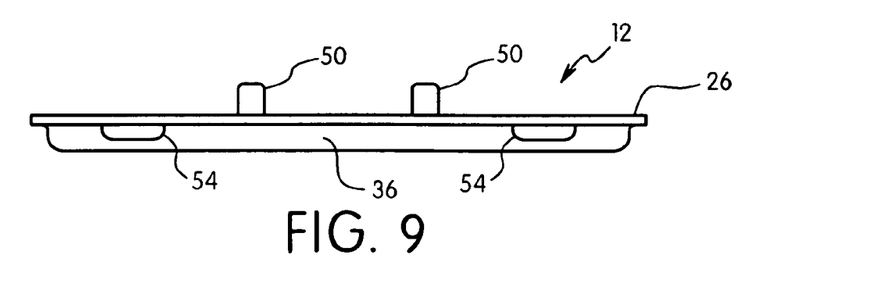
FIG. 9 is a side elevational view of the mounting plate.
Figure 10:
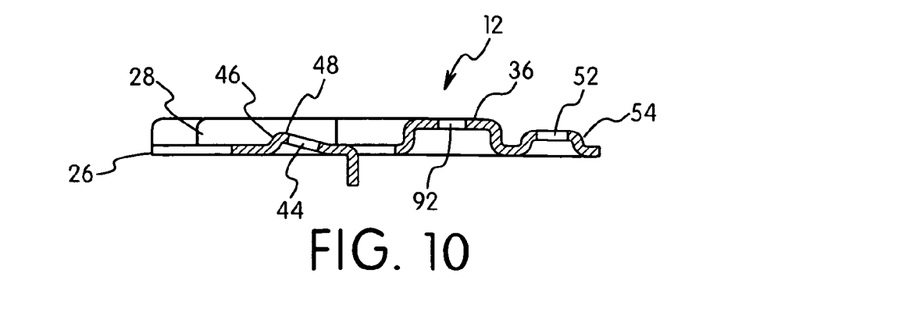
FIG. 10 is a cross sectional side view of the mounting plate taken along line 10-10 of FIG. 8.
Figure 12:
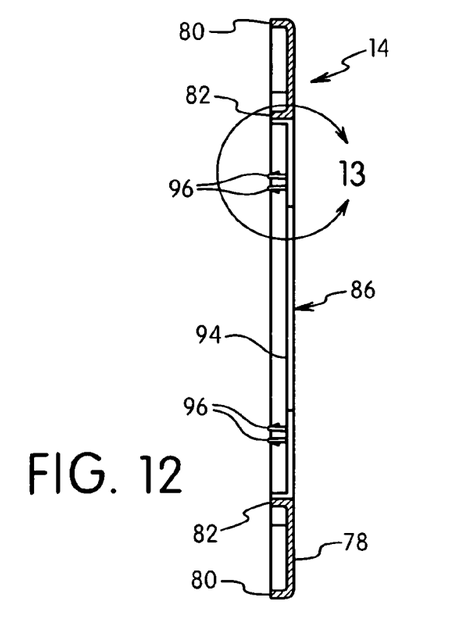
FIG. 12 is a cross sectional side view of the cover plate of FIG. 11 take along line 12-12 of FIG. 11.
Figure 13:
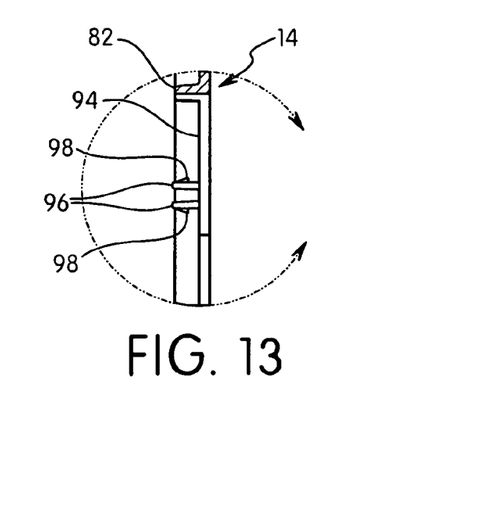
FIG. 13 is an enlarged cross sectional side view of the coupling prongs of the cover plate taken along line 13-13 of FIG. 12.

In one embodiment of the invention, cover plate 14 is attached to mounting plate 12 by a snap connection. Referring to FIG. 8, longitudinal rib 36 includes an opening 92 at each longitudinal end. In the embodiment illustrated, openings 92 have a substantially square shape, although other shapes can be provided. Referring to FIGS. 12 and 13, the bottom face 94 of cover plate 14 includes prongs 96 having a hooked end 98 which extend substantially perpendicular to the plane of cover plate 14. Prongs 96 are aligned with the openings 92 that are inserted into the openings 92 to removably attach cover plate 14 to mounting plate 12. Preferably, cover plate 14 is attached to mounting plate 12 before the electrical fixture 24 is attached to mounting bracket 22 so that electrical fixture 24 sits flush against the outer surface of cover plate 14 as shown in FIG. 2. Cover plate 14 preferably has a dimension to cover the mounting plate 12, the opening in the ceiling and the electrical box 20. The dimension of the central opening of cover plate 14 is preferably covered by the electrical fixture 24.

While various embodiments have been chosen to illustrate the invention, it will be understood by those skilled in the art that various changes and modifications can be made without departing from the scope of the invention as defined in the appended claims.

What is claimed is:

1. A mounting assembly for mounting an electrical fixture to a support member, said mounting assembly comprising: a mounting plate having a first portion with a plurality of apertures for aligning with the support member and receiving a plurality of screws for attaching said mounting plate to the support member, a tab extending upwardly perpendicular to a plane of said mounting plate and positioned for aligning said first portion of said mounting plate and apertures with respect to the support member, and a second portion extending from said first portion and having a threaded I fastener received in a threaded hole and configured for coupling with and supporting the electrical fixture and where said second portion and threaded hole and threaded fastener are cantilevered with respect to said first portion and the support member, whereby the weight of the electrical fixture is supported directly by said second portion, said tab being positioned between said first portion and second portion, and further comprising an electrical box adapted for mounting next to the support member and having an open end positioned above the second portion and spaced from the first portion.

2. The mounting assembly of claim 1, further comprising a cover plate overlying and coupling said mounting plate and having a central opening.

3. The mounting assembly of claim 1, wherein said first portion has a plurality of strengthening ribs.

4. The mounting assembly of claim 3, wherein at least one of said apertures in said first portion is formed at an incline with respect to a plane of said mounting plate.

5. The mounting assembly of claim 3, wherein said plurality of apertures in said first portion are oriented in a longitudinal dimension, and where said strengthening ribs extend transversely with respect to said longitudinal dimension to resist deflection of said second portion with respect to said first portion.

6. The mounting assembly of claim 1, wherein said first portion has a longitudinal dimension with said plurality of apertures spaced apart along said longitudinal dimension, and a width complementing a width of the ceiling joist.

7. The mounting assembly of claim 1, wherein said electrical box is attached to a side of the ceiling joist and has an open end positioned at a bottom edge of said ceiling joist, and where said first portion is coupled to said ceiling joist, and said second portion and threaded fastener are supported below said open end of said electrical box.

8. An electrical assembly comprising:
an electrical fixture, an electrical box adapted for mounting adjacent a side of a ceiling support, and a mounting assembly for mounting the electrical fixture to the ceiling support and below the electrical box, the mounting assembly comprising:
a mounting plate for mounting to the ceiling support and overlying a portion of an open end of the electrical box, said mounting plate having a first portion with a plurality of aligned apertures for receiving mounting screws and attaching said mounting plate to the ceiling support, a tab extending upward from a plane of said first portion for aligning with an inner edge of the electrical box, and a second portion extending from said first portion and ceiling support and having a fastener coupled to and supporting the electrical fixture below said second portion and the electrical box, said fastener being a downwardly threaded bolt, the second portion having a dimension to overlie a portion of the open end of the electrical box to enable wiring to pass from the electrical box to the electrical fixture and where said fastener and electrical fixture are cantilevered with respect to said first portion and said ceiling support and the weight of the electrical fixture is supported by said second portion.

9. The mounting assembly of claim 8, wherein said first portion has a longitudinal dimension and a plurality of strengthening ribs extending transversely with respect to said longitudinal dimension for resisting deflection of said second portion with respect to said first portion.

10. The mounting assembly of claim 9, wherein at least one of said apertures in said first portion is formed at an incline with respect to a plane of said mounting plate.

11. The mounting assembly of claim 8, further comprising a cover plate coupled to said mounting plate and having a central opening to allow wiring to pass between said electrical box and said electrical fixture.

12. The mounting assembly of claim 11, wherein said cover plate includes a plurality of coupling prongs extending from an inner surface, and where said mounting plate includes a plurality of apertures for receiving said coupling prongs.

13. The mounting assembly of claim 8, further comprising a ceiling substrate attached to the ceiling support and where the mounting plate is mounted to a bottom surface of the ceiling substrate and said mounting screws pass through said ceiling substrate.

14. The mounting assembly of claim 8, wherein
said tab is positioned between said first portion and second portion.

15. A method of suspending an electrical fixture from a ceiling support having an electrical box adjacent the ceiling support, the electrical box having a downwardly open end at an outer face of a ceiling substrate, the method comprising the steps of:
positioning a mounting plate below said ceiling support, said mounting plate having a first portion aligned with the ceiling support and having a plurality of apertures aligned with said ceiling support, and a second portion overlying a portion of said open end of said electrical box, said second portion extending from said first portion and said ceiling support and having a coupling member for supporting the weight of the electrical fixture from the second portion;
passing a plurality of fasteners through a respective hole in said first portion of said mounting plate and into said ceiling support to fasten said first portion of said mounting plate to said ceiling support, and where said second portion and coupling member for the electrical fixture are cantilevered with respect to said first portion and said ceiling support;
coupling a mounting bracket to said second portion of said mounting plate;
coupling the electrical fixture to the mounting bracket and passing wiring between said electrical box and said electrical fixture, wherein said electrical fixture is suspended below said open end of said electrical box and cantilevered with respect to said ceiling support and said first portion, whereby the weight of the electrical fixture is supported by said second portion.

16. The method of claim 15, further comprising
a ceiling substrate mounted to the ceiling support and having an opening aligned with the open end of the electrical box, and where said method comprises:
positioning the first portion of the mounting plate over an outer surface of the ceiling substrate and the second portion of the mounting plate to overlie a portion of the opening in the ceiling substrate to form a gap for electrical wiring to pass between the electrical box and the electrical fixture.

17. The method of claim 15, wherein
said mounting plate includes an upwardly extending tab, said method comprising:
aligning the tab with a side edge of the electrical box.

18. The method of claim 15, further comprising
a cover plate, said method comprising:
coupling the cover plate to the mounting plate, whereby the cover plate is positioned between the mounting plate and the electrical fixture.

19. A mounting assembly adapted for supporting an electrical fixture, said assembly comprising:
an electrical fixture; and
a mounting member having a first portion and a second portion lying in substantially the same plane, a tab between said first portion and second portion and extending in an upward direction with respect to said mounting assembly and being adapted for aligning said mounting assembly with respect to said support member, the first portion having a plurality of apertures for receiving fasteners coupling the mounting member to a support member, the second portion being spaced from the first portion and the support member, the second portion having at least one threaded hole extending through the second portion receiving a threaded screw coupled to and supporting the electrical fixture spaced from the support member and the first portion, and where the coupling member, electrical fixture and the second portion are cantilevered with respect to the first portion and support member, whereby the weight of the electrical fixture is carried by the second portion.

20. The mounting assembly of claim 19, further comprising:
an electrical box adapted for mounting next to the support member and having an open end positioned above the second portion and spaced from the first portion, where said coupling member and electrical device are supported below said electrical box.

* * * * *